United States Patent
Duyvesteyn (10) Patent No.: US 8,372,367 B2
(45) Date of Patent: Feb. 12, 2013

(54) SYSTEM AND METHOD FOR RECOVERING BORON VALUES FROM PLANT TAILINGS

(75) Inventor: Willem P. C. Duyvesteyn, Reno, NV (US)

(73) Assignee: EMC Metals Corporation, Vancouver, British Columbia (CA)

( * ) Notice: Subject to any disclaimer, the term of this patent is extended or adjusted under 35 U.S.C. 154(b) by 331 days.

(21) Appl. No.: 12/911,717

(22) Filed: Oct. 25, 2010

(65) Prior Publication Data

US 2011/0097254 A1    Apr. 28, 2011

Related U.S. Application Data (60) Provisional application No. 61/279,885, filed on Oct. 26, 2009, provisional application No. 61/279,886, filed on Oct. 26, 2009, provisional application No. 61/280,372, filed on Nov. 2, 2009, provisional application No. 61/279,868, filed on Oct. 26, 2009.

(51) Int. Cl.
*C01B 35/10* (2006.01)
*B01D 1/00* (2006.01)
*B01D 1/26* (2006.01)
*B01D 15/36* (2006.01)
*B01D 3/38* (2006.01)

(52) U.S. Cl. ........... 423/283; 159/47.1; 159/22; 203/41; 203/83; 203/92

(58) Field of Classification Search .................. 423/283; 588/20, 315; 159/47.1, 22; 203/41, 83, 91, 203/92
See application file for complete search history.

(56) References Cited

U.S. PATENT DOCUMENTS

| | | | |
|---|---|---|---|
| 3,004,058 A | 9/1954 | Cunningham | |
| 4,540,512 A * | 9/1985 | Lahoda | 423/278 |
| 5,229,003 A | 7/1993 | Duyvesteyn | |
| 5,236,491 A | 8/1993 | Duyvesteyn et al. | |
| 2006/0240534 A1* | 10/2006 | Yamaguchi et al. | 435/131 |

OTHER PUBLICATIONS

Yoshimura, K. et al "Complexation of Boric Acid with N-methyl-d-glucamine Group in Solution and in Crosslinked Polymer" J Chem Soc, Faraday Trans, 1998, 94 (5), pp. 683-689.*
Hicks et al, "Removal of boric acid and related compounds from solutions of carbohydrates with a boron-selective resin (IRA-743)," 1986, Carbohydrate Research vol. 147, pp. 39-48.*
Unterreiner et al, "Breaking the Trimethyl Borate-Methanol Azeotrope with Supercritical Methane," 1991, Ind. Eng. Chem. Res. vol. 30, pp. 740-745.*
Specification paper; Trimethyl borate, azeotrope mixture with methanol; www.jsc-aviabor.com; Jun. 29, 2010; 1 page.
Thompson, Raymond; "Industrial Applications of Boron Compounds"; Pure and Applied Chemistry, 1974; 13 pages.
Docks, E.L.; "Boric Acid Esters"; 2000; Kirk-Othmer Encyclopedia of Chemical Technology; 10 pages.
Unterreiner and McHugh; "Breaking the Trimethyl Borate-Methanol Azeotrope with Supercritical Methane"; 1991 American Chemical Society; Ind. Eng. Chem. Res.; 30, pp. 740-745.

* cited by examiner

*Primary Examiner* — Steven Bos
*Assistant Examiner* — Justin Bova
(74) *Attorney, Agent, or Firm* — John A. Fortkort; Fortkort & Houston P.C.

(57) ABSTRACT

A method is provided for recovering boric acid from a solution containing boric acid and at least one lithium compound. The method comprises (a) passing the solution through an ion exchange resin such that boric acid accumulates on the resin; (b) removing the boric acid from the resin with an aqueous alcohol solution, thus obtaining a first solution comprising an alcohol, boric acid, and water; (c) converting at least a portion of the boric acid to trimethyl borate, thereby obtaining a second solution; (d) distilling an azeotrope from the second solution, wherein the azeotrope contains trimethyl borate; and (e) recovering boric acid from the azeotrope.

19 Claims, 6 Drawing Sheets

FIG. 6 ary materials. However, these techniques are not suitable for the recovery of boric acid from boric acid plant tails, because the concentration of boric acid in the plant tails is typically too high for these approaches to be feasible. Moreover, the presence of solids in the plant tails significantly complicates ion exchange and solvent extraction, and adversely affects the economics of these approaches.

SYSTEM AND METHOD FOR RECOVERING BORON VALUES FROM PLANT TAILINGS

CROSS-REFERENCE TO RELATED APPLICATIONS

This application claims priority to U.S. Ser. No. 61/279,885, entitled "RECOVERY OF BORIC ACID FROM PLANT TAILINGS", which was filed on Oct. 26, 2009, and which is incorporated herein by reference in its entirety; to U.S. Ser. No. 61/279,886, entitled "SEPARATION OF BORIC ACID FROM LITHIUM-BORON SOLUTIONS", which was filed on Oct. 26, 2009, and which is incorporated herein by reference in its entirety; to U.S. Ser. No. 61/280,372, entitled "SEPARATION OF BORON FROM LITHIUM-BORON SOLUTIONS", which was filed on Nov. 2, 2009, and which is incorporated herein by reference in its entirety; and to U.S. Ser. No. 61/279,868, entitled "RECOVERY OF BORIC ACID FROM DEWATERED BORIC ACID PLANT", which was filed on Oct. 26, 2009, and which is incorporated herein by reference in its entirety.

FIELD OF THE DISCLOSURE

This application relates to recovery of boron from plant tailings and other feedstock materials.

BACKGROUND OF THE DISCLOSURE

Boron occurs in nature principally in the form of borate minerals. These minerals are mined industrially as evaporate ores, such as borax and kernite. Elemental boron is used extensively as a dopant in the semiconductor industry, while boron compounds have a variety of industrial applications, including their use in sodium perborate bleaches and in fiberglass insulation. Thus, for example, boric acid is used in the manufacture of monofilament fiberglass usually referred to as textile fiberglass. Boron compounds also find use as high-strength, lightweight structural and refractory materials and in thermally stable glasses and ceramics, while boron-containing reagents are used as chemical intermediates in the synthesis of a variety of organic compounds.

Boron minerals are typically recovered through surface mining of evaporate mineral deposits such as those found at Boron, Calif. and Searles Lake, Calif., although methods are also known for recovering boron from geothermal brines. Unfortunately, many commercially promising evaporate deposits of boron minerals also contain significant amounts of lithium minerals. The presence of these lithium minerals represents a significant devaluation in the value of the deposits, due to the current lack of a commercially effective means for separating the lithium and boron values.

Moreover, conventional mining practices create a significant amount of waste materials that represent lost profits and raise environmental issues. These waste materials, often referred to as "tailings", are the materials left over after the separation of the valuable fraction of an ore from the uneconomic fraction (or gangue). In a typical boric acid mining operation, these tailings are discharged to a tailings pond (in the case of liquid tailings mixtures), or to tailings piles (in the case of tailings solids).

Tailings represent a significant cost to a mining operation. Frequently, a mining company must employ expensive measures, such as dams or water barriers, to maintain a tailings pond and to prevent its contents from contaminating the local groundwater supply or environment. Indeed, the costs associated with a tailings pond are frequently the most significant environmental liability for a mining operation. Typically, environmentally responsible mining companies operating in jurisdictions with well developed mining regulations must account for the cost of the closure and rehabilitation of tailings ponds in their operations. In some jurisdictions, such as the province of Quebec, Canada, a closure plan for tailings ponds is required before mining activities may commence, and a financial deposit, amounting to 70% of the estimated rehabilitation costs, is also required.

Conventional technologies, such as ion exchange and solvent extraction, provide suitable extraction techniques for a variety of materials. However, these techniques are not suitable for the recovery of boric acid from boric acid plant tails, because the concentration of boric acid in the plant tails is typically too high for these approaches to be feasible. Moreover, the presence of solids in the plant tails significantly complicates ion exchange and solvent extraction, and adversely affects the economics of these approaches.

Some alternative methods have been developed in the art for separating lithium and boron minerals. For example, U.S. Pat. No. 5,236,491 (Duyvesteyn) discloses a method for the selective removal of boron from geothermal brines which involves passing the brines over a bed of an anionic resin. A pH value of about 4 to 5.5 is maintained to load the boron on the resin. The boron content is then stripped from the resin with an acid solution such as 1M hydrochloric or sulfuric acid. While this approach represents a notable advance in the art and may be useful in extracting boron values from relatively dilute brines, the resin must be in basic form before it can load boron. Hence, after the resin is stripped with an acidic solution, it must be subsequently washed with an alkaline solution in order to reactivate it. These requirements cause this technique to be cumbersome and uneconomical in practice in many applications, particularly if it is to be applied to feedstocks having higher concentrations of boron values.

SUMMARY OF THE DISCLOSURE

In one aspect, a method for recovering boric acid from a solution containing boric acid and at least one lithium compound is provided. The method comprises (a) passing the solution through an ion exchange resin such that boric acid accumulates on the resin; (b) removing the boric acid from the resin with an aqueous alcohol solution, thus obtaining a first solution comprising an alcohol, boric acid, and water; (c) converting at least a portion of the boric acid to trimethyl borate, thereby obtaining a second solution; (d) distilling an azeotrope from the second solution, wherein the azeotrope contains trimethyl borate; and (e) recovering boric acid from the azeotrope.

In another aspect, a method for recovering boric acid from a solution containing boric acid and at least one lithium compound is provided. The method comprises (a) passing the solution through an ion exchange resin comprising N-methyl glucamine such that boric acid accumulates on the resin; (b) removing the boric acid from the resin with an aqueous methanol solution, thus obtaining a first solution comprising methanol, boric acid, and water; (c) converting at least a portion of the boric acid in the first solution to trimethyl borate, thereby obtaining a second solution; (d) distilling an azeotrope from the second solution, wherein the azeotrope contains trimethyl borate; (e) adding water to the distilled azeotrope under conditions which result in the precipitation of boric acid therefrom; and (f) isolating the boric acid from the supernatant through filtration.

In a further aspect, a method is provided for recovering boric acid from a resin loaded with boric acid. The method comprises (a) removing the boric acid from the resin with an aqueous alcohol solution, thus obtaining a first solution comprising an alcohol, boric acid, and water; (b) converting at least a portion of the boric acid to trimethyl borate, thereby obtaining a second solution; (c) distilling an azeotrope from the second solution, wherein the azeotrope contains trimethyl borate; and (d) recovering boric acid from the azeotrope.

In still another aspect, a method is provided for removing boric acid from a resin. The method comprises (a) providing a resin which is impregnated with boric acid; and (b) removing the boric acid from the resin with an aqueous alcohol solution.

In one aspect, a method is provided for recovering boron values from boric acid plant tailings. The method comprises (a) creating a mixture of boric acid plant tailings and an alcohol, wherein the plant tailings contain boric acid; (b) converting at least a portion of the boric acid content of the mixture to an organic borate; and (c) distilling an azeotrope of the organic borate from the mixture.

In another aspect, a method for recovering boron values from boric acid plant tailings is provided. The method comprises (a) creating a mixture of boric acid plant tailings and methanol, wherein the plant tailings contain boric acid; (b) converting at least a portion of the boric acid content of the mixture to trimethyl borate; (c) distilling an azeotrope from the mixture, wherein the azeotrope comprises trimethyl borate, water, and methanol; and (d) precipitating boric acid from the distillate.

In still another aspect, a method is provided for recovering boron values from dry boric acid plant tailings. The method comprises (a) providing a mass of dry, particulate plant tailings containing boron values, wherein the boron values include boric acid; (b) extracting at least a portion of the boron values from the plant tailings with a solvent, thereby obtaining a first solution which contains the extracted portion of the boron values, wherein the solvent forms an azeotropic solution with boric acid; (c) distilling the azeotropic solution from the first solution, thereby obtaining a distillate; and (d) precipitating boric acid from the distillate.

DETAILED DESCRIPTION

While the approach described in U.S. Pat. No. 5,236,491 (Duyvesteyn) represents a notable advancement in the art, as noted above, this approach requires the use of concentrated acids and bases to respectively strip the anionic resin and to reactivate it. Consequently, in practice, this approach is somewhat cumbersome and economically unfriendly. There is thus a need in the art for an improved process for separating boron and lithium minerals which does not suffer from these infirmities.

It has now been found that the foregoing need may be addressed through some of the systems and methodologies disclosed herein. In these systems and methodologies, an anionic resin is used to separate boron and lithium in a manner similar to that described in U.S. Pat. No. 5,236,491 (Duyvesteyn). However, rather than using concentrated acidic solutions to strip the boron from the resin, the boron content is instead removed from the resin with a precursor solution which reacts with the boron content (typically in the form of boric acid) to form an azeotropic solution. The precursor solution may be, for example, a warm aqueous solution of methanol, which reacts with boric acid to form an azeotrope comprising water, trimethyl borate and methanol. This azeotrope may then be distilled from the resulting mixture. Boric acid may subsequently be recovered from the distillate through the addition of water (preferably in combination with chilling the distillate), which causes precipitation of the boric acid. The precipitate may then be recovered and purified by any of the suitable means known to the art including, for example, vacuum filtration.

It will also be appreciated from the foregoing that there is a significant need in the art for a means for eliminating or reducing the need for tailings ponds in boron mining operations. There is further a need in the art for a means for economically extracting boric acid and other valuable materials from these waste products. There is also a need in the art for extracting boron content from waste streams containing lithium values, given the propensity for such lithium values to adversely interfere with the extraction of the boron values. These and other needs may be addressed with the systems and methodologies disclosed herein.

It has now been found that these issues may be addressed with some of the systems and methodologies disclosed herein. In these systems and methodologies, azeotropic distillation is utilized to recover boron values from tailing ponds, or from product, byproduct or waste streams of a type that are frequently stored in a tailing pond. Additional products, such as arsenic and $Na_2SO_4$, may also be recovered from the tailings stream through additional processing steps. Finally, liquid/solid separation is used to remove the solids content from the tailings stream. These solids may be disposed of as dry tails. The remaining liquid, which is now devoid of solids and such environmentally harmful materials such as arsenic, may be disposed to a storage pond.

It will also be appreciated from the foregoing that there is a significant need in the art for a means for treating plant tailings in boron mining operations which are solid, or which contain high solids contents. Such tailings represent a significant lost value in a typical mining operation.

It has now been found that this need may be addressed with some of the systems and methodologies described herein, which are especially useful for recovering boron values from dry or nearly dry tailings materials. These materials typically contain solid sodium sulfate, clay fines, and other such materials which can serve as binding agents in the formation of pellets from the material. This pelletized material may advantageously be used as the solid phase in schemes which preferably utilize solid-liquid extraction techniques (using an organic alcohol such as methanol) to extract boron values from the pelletized material.

Some of the systems and methodologies described herein, when applied to dry or nearly dry tailings materials, may have significant advantages in certain applications in comparison to conventional aqueous extraction techniques, such as ion exchange or solvent-solvent extraction techniques based on water immiscible organic alcohols. The boron species present in the tailings materials from a typical boric acid mining facility are principally precipitated boric acid ($H_3BO_3$) or borax ($Na_2B_4O_7 \cdot 10H_2O$ or $Na_2B_4O_7 \cdot 5H_2O$). The boron species may be selectively extracted using this technique, because they are highly soluble in the methanol liquid phase. Boric acid solubility at 25° C. is 22.7% by weight in a saturated methanol solution, and borax solubility is slightly lower at 19.9% by weight in a saturated methanol solution. The solubilities of these compounds are significantly lower in water at 25° C. as saturation of borax and boric acid occurs at 5.8% and 5.5%, respectively.

The use of solid-liquid extraction with methanol has two advantages over aqueous extraction approaches. First of all, methanol selectively dissolves the boron species over other species, such as lithium species, which are commonly found in the tailings materials. Secondly, the solubilities of the boron species are somewhat higher in methanol than in water. Hence, the dissolution of the boron values in methanol or other alcohols may also serve to partially purify the boron species, while at the same time providing a more concentrated process stream. These advantages are described in greater detail below.

Figure 1:
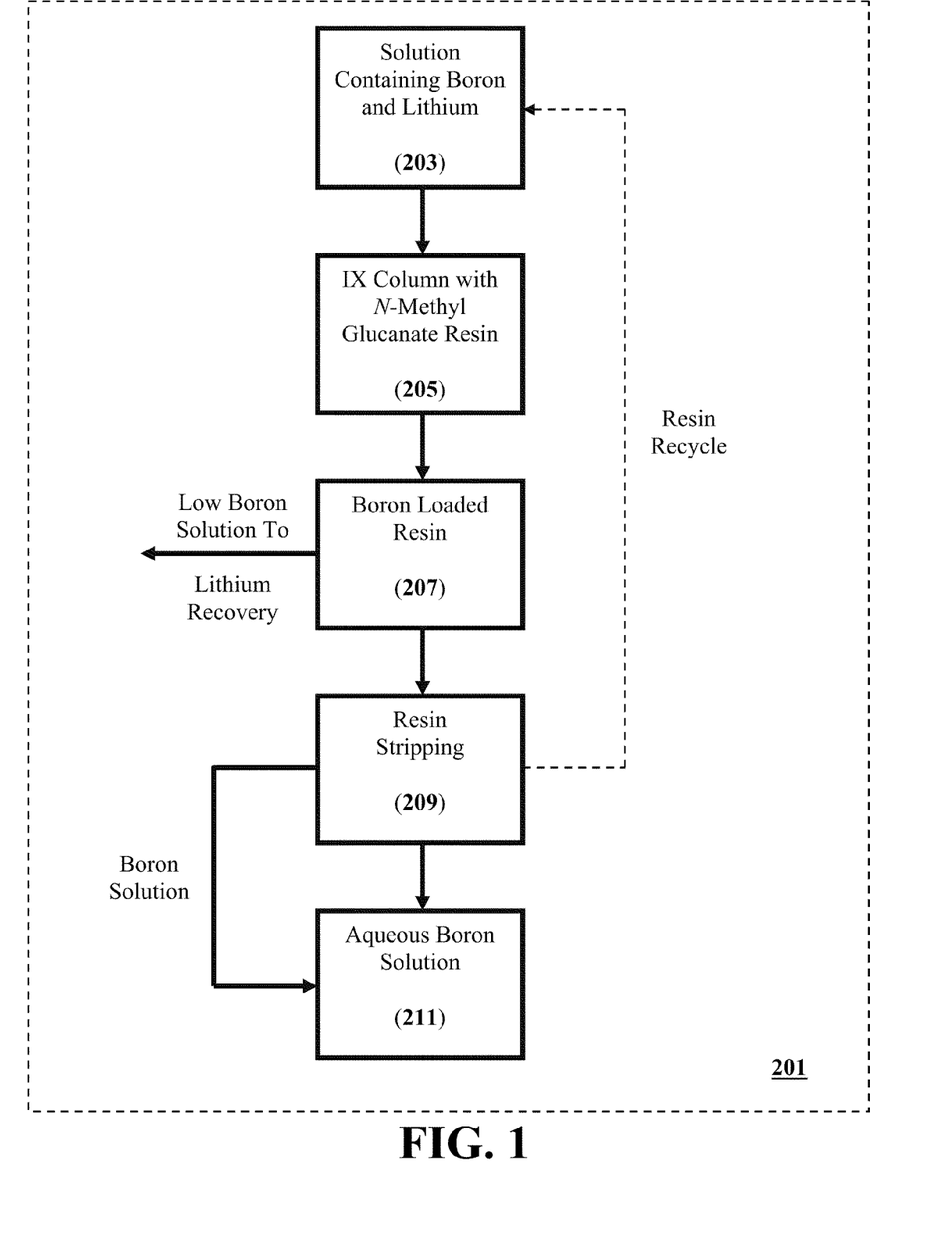
FIG. 1 is a flowchart illustrating a first embodiment of a method for recovering boron in accordance with the teachings herein which utilizes an ion exchange resin to separate boron and lithium values.

The systems and methodologies disclosed herein may be further understood with respect to the flowchart of FIG. 1, which depicts a first particular, non-limiting embodiment of a process in accordance with the teachings herein. The process 201 in this particular embodiment commences with a solution 203 containing a mixture of lithium and boron compounds. Such a solution may be obtained, for example, from a leaching process performed on a mineral feedstock, from a tailing pond located at a mining facility, or by other suitable means.

In some implementations, various preliminary steps may be performed to prepare the solution for input to the process. For example, the solution may be subjected to various filtration or pretreatment steps to remove contaminants, impurities or particulates therefrom, to remove components from the solution that might interfere with subsequent processing steps, or to adjust the pH, surface tension or chemical profile of the solution.

Referring again to FIG. 1, after any preliminary steps are performed on the solution as may be necessitated by the application at hand, the solution is passed through a resin bed 205 which is selective (and preferably highly selective) to the boron compounds. Preferably, the principle boron compound is boric acid, which occurs naturally in many evaporate deposits as the mineral sassolite, and which also commonly occurs as a constituent of many other minerals, including borax, boracite, boronatrocalcite and colemanite. Boric acid may also be formed by the preliminary treatment of certain minerals. Thus, for example, boric acid may be prepared by reacting borax (sodium tetraborate decahydrate) with a mineral acid, such as hydrochloric acid, in accordance with the following reaction:

(REACTION 1)

It will thus be appreciated from the foregoing that, in many of the implementations of the methodologies disclosed herein, the preliminary treatment of the solution may be directed towards converting one or more of the components thereof to boric acid.

The resin bed utilized in this process preferably comprises a resin which is selective to boron, and more particularly to the particular boron compounds in the solution so that, when the solution is passed through the resin, essentially all of the boron content is retained on the resin. As indicated above, it is preferred that essentially all of the boron in the solution is present as boric acid. Preferably, the resin is an anionic exchange resin, and more preferably, an N-methyl glucamine chelating resin. Examples of suitable resins include, without limitation, IRA-743 anionic exchange resins, which are available commercially from Rohm & Haas (Philadelphia, Pa.), and WOFATIT MK51 anionic exchange resins, which are available commercially from Veb Chemiekombinat Bitterfeld (Nünchritz, Germany). By way of illustration, WOFATIT MK51 is a macroporous styrenedivinylbenzene copolymer with vicinal aliphatic hydroxyl groups as the active group. The choice of a particular matrix and active group may be chosen in light of such factors as thermal stability, loading capacity, impurities present in the solutions being treated, physical stability and ease of stripping and regeneration. IRA-743 and WOFATIT MK51 provide boron loadings between about 1 to 3.5 mg boron per ml of resin, depending upon flow rates and the particular impurities present in the solutions being treated.

The resin bed in the systems and methodologies described herein may be deployed in various manners, depending in part on the particular details of the processing plant. Preferably, however, the resin will be deployed in a tower or column. Elution through the resin bed may occur through gravity, by maintaining pressure above the bed and/or a vacuum below it, or by other suitable means as are known to the art. Embodiments are also possible which use centrifugal force to force the fluid through the resin. Preferably, the solution being treated is kept in contact with the resin for a sufficiently long duration to provide substantially complete removal of the desired ion, while also providing high and uniform throughput. The resin may be removed periodically to recover the desired ion and to reactivate the resin, if necessary.

It will be appreciated that the use of resins to extract boron, rather than the use of solvent extraction techniques, has several advantages. For example, the use of resins minimizes the loss of organic materials to the treated solution or to the atmosphere, thereby minimizing both the operating costs and environmental concerns. Moreover, the solvents used in solvent extraction frequently contain trace amounts of metals and other impurities, and thus may be a source of contaminants for the process.

Referring again to FIG. 1, the solution containing a mixture of boron and lithium compounds is passed through the resin. As this process proceeds, the resin becomes loaded with boron 207, and the boron concentration in the eluate is essentially depleted. The eluate may then be passed to a lithium recovery facility for further treatment to extract the lithium values from it.

An optimal point of boron loading in the resin may be determined empirically, or may be determined by monitoring the chemical composition of the eluate from the resin bed or the concentration of one or more species in the eluate. Such monitoring may be direct (that is, it may involve direct measurement of the concentration of a chemical species as, for example, through the use of one or more suitable spectrographic methods) or indirect (that is, it may involve measurement of a physical property of the eluate, such as potential, which varies in accordance with the concentration of the target species).

Figure 2:
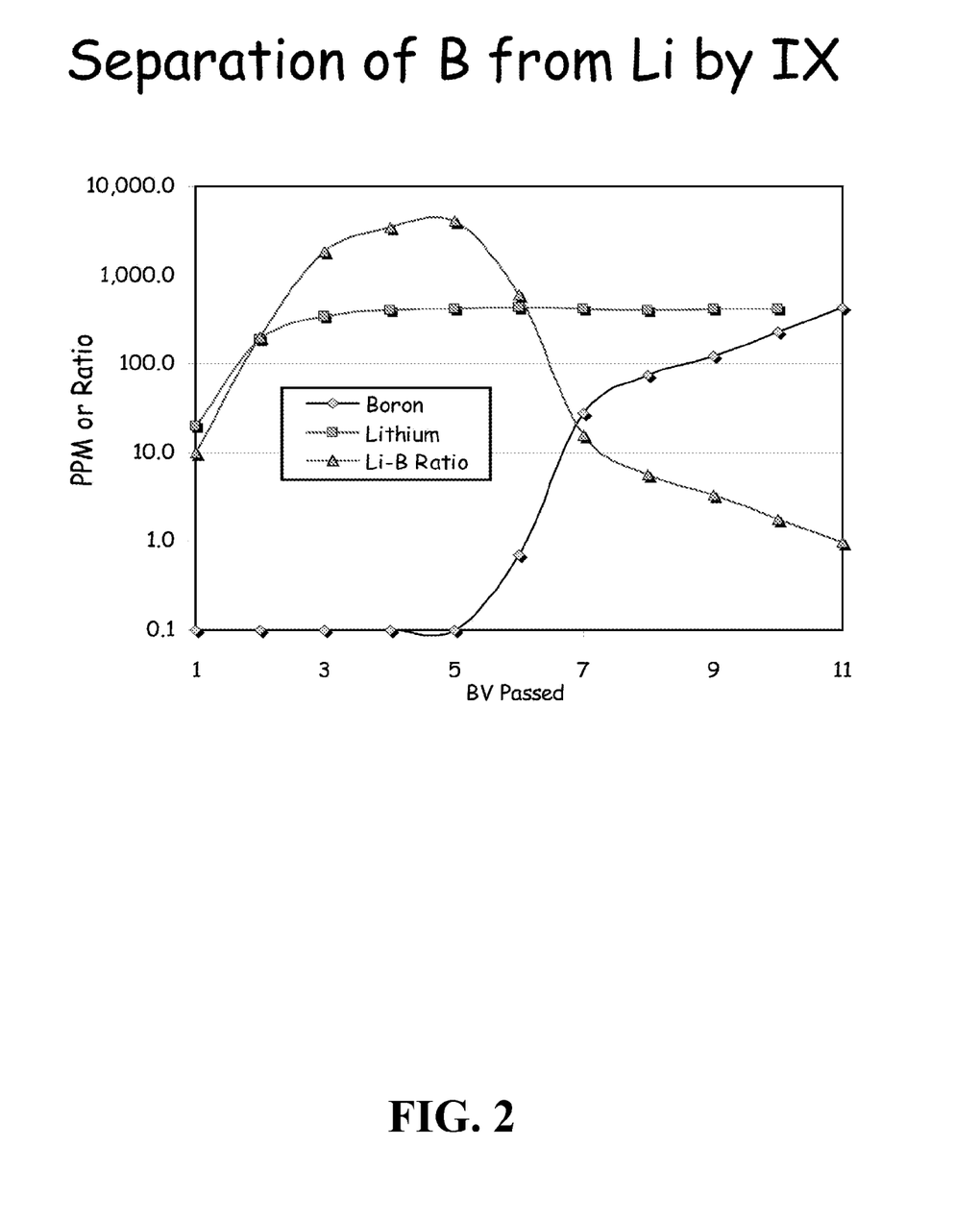
FIG. 2 is a graph of PPM (or ratio) of boron and lithium concentrations as a function of boron volume passed.

FIG. 2 illustrates the results obtained with a particular, non-limiting embodiment of the methodology described herein. In this particular example, an aqueous solution comprising boric acid and lithium salts (with a Li:B ratio of about

1) was passed through a column containing an N-methyl glucamine chelating resin. The concentration of boron and lithium in the eluate, and the Li—B ratio in the eluate, was measured during resin loading, and the results are depicted graphically as a function of the volume of eluate (BV, or boron volume passed). For purposes of illustration, no attempt was made to stop the process as the resin loading reached a saturation point.

As seen from FIG. 2, the B:Li ratio in the early part of the process is in excess of 10,000:1. This type of selectivity is exceptional in a process of this type, and illustrates the efficacy of the systems and methodologies disclosed herein. Of course, one skilled in the art will appreciate that, in a commercial implementation of the process, the process would preferably be stopped at an optimum loading boron level. Since this was not done here in order to illustrate the effect of the resin before and after it has become fully loaded, it is seen in FIG. 2 that, as boron loading reaches a saturation point in the resin, the concentration of boron in the eluant begins to increase until the Li:B ratio begins to approach that found in the eluent. It is to be noted that boron impurities in lithium salts are highly detrimental to the electrolytic production of lithium metal. Hence, the ability of the systems and methodologies disclosed herein to produce nearly boron-free lithium salts adds significant value to the lithium production side of the operation.

Referring again to FIG. 2, after the resin has been loaded with boron, elution is terminated, and the resin is stripped 211 to extract the boron content from it and to reactivate the resin for further use. As noted above, the approach of U.S. Pat. No. 5,236,491 (Duyvesteyn), while representing a notable advance in the art, is disadvantageous in that an acid solution (sulfuric or hydrochloric acid) having a concentration of about 1M is typically used to strip the N-methyl glucamine chelating resins. Since the resin has to be in basic form before it can be reused to absorb more boron from the feed solution, this approach requires the resin to be subsequently washed with a caustic solution to reactivate it. This approach, which requires the consecutive treatment of the resin with strong acids and bases, is both cumbersome and environmentally unfriendly.

In a preferred embodiment of the systems and methodologies described herein, the foregoing infirmities are overcome by using a precursor solution that forms an azeotropic mixture with the stripped boron. In a preferred embodiment, the precursor solution is a warm, aqueous solution of methanol. This solution effectively removes the boron content from the resin, after which the resin may be regenerated (if necessary) and may be reloaded with boron from the boron-lithium feed solution. Advantageously, this approach allows the resin to be stripped of boron without the use of any acid, thus obviating the need to subsequently wash the resin with an alkaline solution.

The use of an aqueous solution of methanol to strip the resin also affords the opportunity to purify the extracted boric add in a simplified fashion. Organic alcohols such as methanol ($CH_3OH$) are known to react with boric acid according to REACTION 2, wherein boric acid is reacted with methanol to form the borate ester, trimethyl borate:

(REACTION 2)

Although this is an equilibrium reaction, it can be driven to the product side by removal of $B(OCH_3)_3$ (trimethyl borate) through azeotropic distillation. In this approach, the $B(OH)_3$ (boric acid) solution is combined with an excess of methanol. After the mixture is heated to approximately 70° C., a constant boiling azeotrope of trimethyl borate and methanol can be distilled. This azeotrope has a boiling point of approximately 54-56° C. (by contrast, the boiling point of trimethyl borate is 68-69° C., and the boiling point of methanol is about 65° C.).

It will be appreciated from the foregoing that impure boron, in the form of aqueous boric acid, can be converted to a borate ester, such as trimethyl borate. The ester is may then be removed from the solution, together with methanol and water, by distillation (followed by condensation and cooling) to yield a purified methanol-trimethyl borate solution. Typically, this distilled solution will contain about 75% by mass trimethyl borate. This highly concentrated solution is then mixed with water to obtain boric acid via the hydrolysis reaction of REACTION 3:

(REACTION 3)

Addition of water to the trimethyl borate solution converts the trimethyl borate to purified boric acid, which can then be recrystallized or precipitated from the solution. The methanol and water may then be distilled and recovered for reuse.

Figure 3:
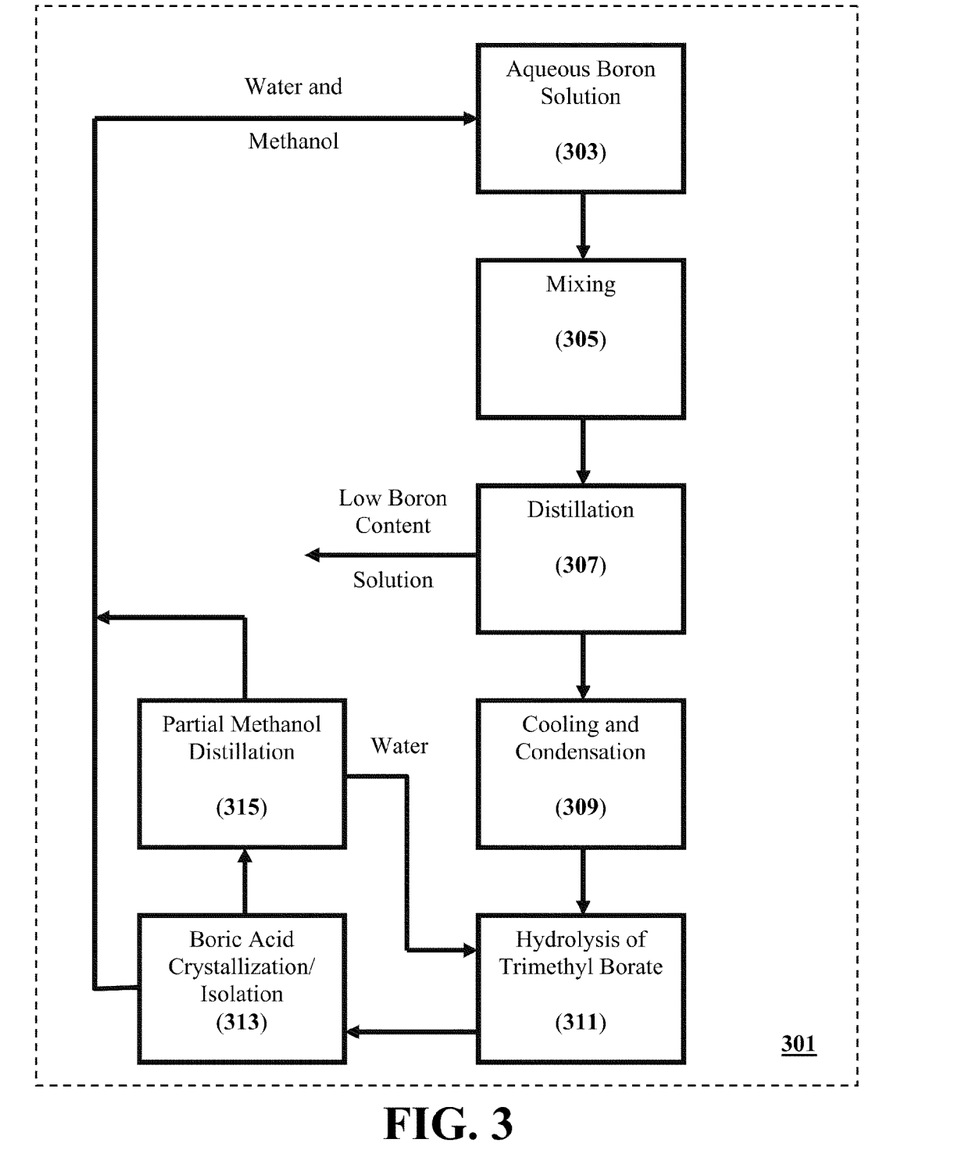
FIG. 3 is a flowchart illustrating a second embodiment of a method for recovering boron in accordance with the teachings herein which utilizes azeotropic distillation to isolate boron values.

FIG. 3 is a flowchart of a particular, non-limiting embodiment of the foregoing process for obtaining boric acid from the solution used to strip the resin. As seen therein, the process 301 commences with the feed 303 from the resin stripping process, which is a mixture of boron, water and methanol. The feed solution may then be mixed with additional water and methanol 305 (if necessary), which may be recycled from a previous iteration of the process. Mixing may be accomplished with a suitable agitator, which may be, for example, a mechanical stirrer, a magnetic stir bar, or the like. Mixing may also be accomplished by maintaining a continuous flow of fluid within, into and/or out of the mixing chamber.

The mixture resulting from the mixing step is then subjected to distillation 307, which results in removal of the boron from the mixture in the form of a trimethyl borate-methanol-water azeotrope. The remaining liquid, now depleted in boron content, is forwarded to another processing unit for lithium recovery. Meanwhile, the distilled azeotrope is condensed and cooled 309, and the trimethyl borate is hydrolyzed 311 to induce boric acid precipitation 313. The boric acid is then removed from the host liquor 317. The host liquor is then distilled to recover a portion of water which may be utilized in the hydrolysis reaction 311, and to recover a mixture of water and methanol which may be used in the mixing step 305.

Various modifications to the foregoing systems and methodologies are possible. For example, while methanol is the preferred material in forming azeotropic mixtures for the purpose of boron isolation and purification, other alcohols may be used for this purpose as well. Such alcohols may include ethanol, 1-propanol and iso-propanol. Other materials which solubilized boric acid or trimethyl borate, which are capable of forming azeotropic mixtures, and which are suitably selective to boron over lithium may be employed to a similar effect.

While the preferred embodiments of the systems and methodologies disclosed herein use azeotropic formation to remove boron from the impregnated resin, and use subsequent azeotropic distillation to isolate and purify the boron content, one skilled in the art will be appreciate that boron may also be recovered from the loaded resin by elutriation with an aqueous solution of a mineral acid. Hydrochloric or sulfuric acids are preferred due to ready availability and cost. The aqueous solution preferably has an acid concentration between about 10 and 100 g/L to insure substantially complete elutriation of boron to form boron-enriched solution containing between about 1 and 4 g/L boron. The concentration of the mineral acid in the aqueous solution is selected to provide maximum boron elutriation from the resin while minimizing elutriation of undesirable contaminants. While this method of stripping the resin is not the preferred method for the reasons noted above, it still affords substantially complete separation of the lithium and boron content of the feed streams, and may be advantageous in some applications.

Figure 4:
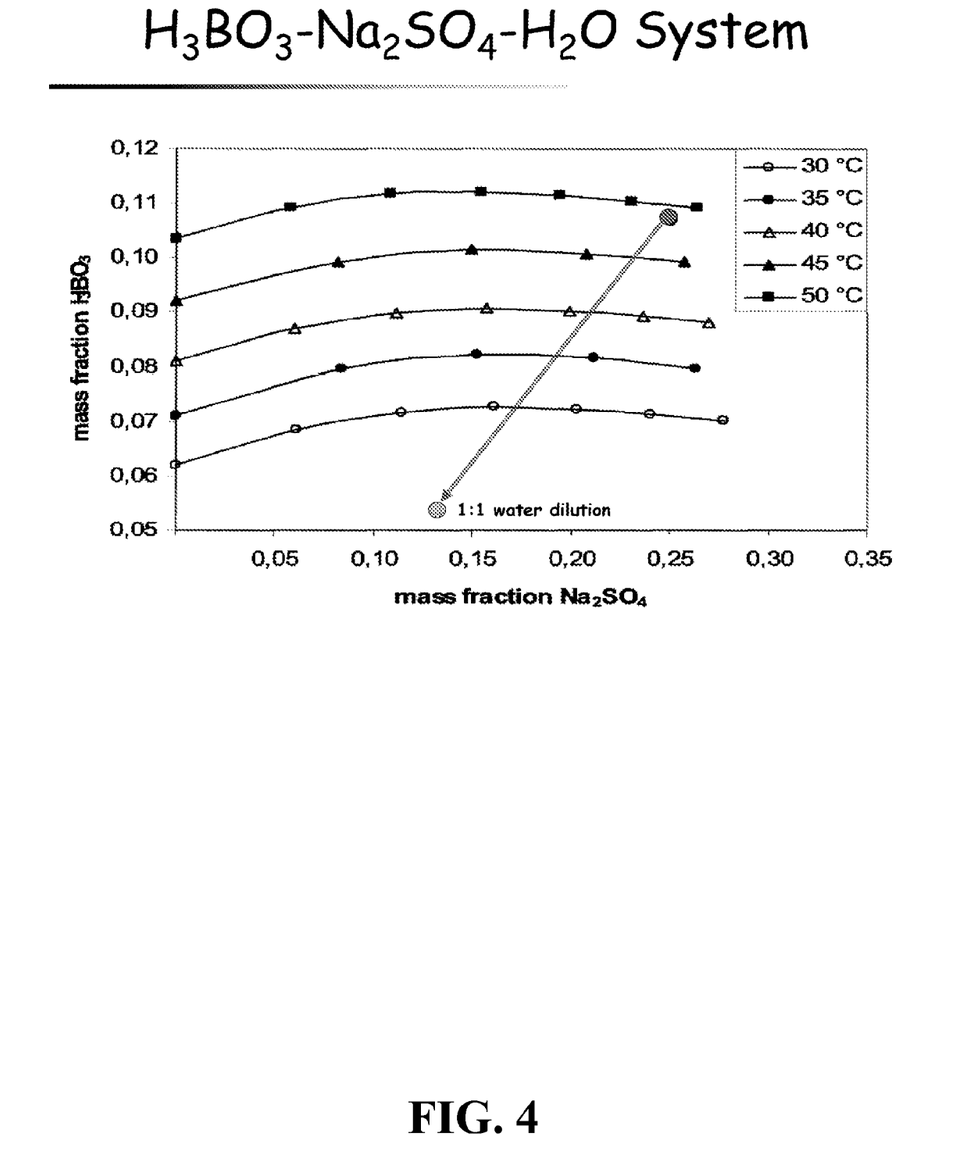
FIG. 4 is a graph depicting various isotherms for mass fraction of $H_3BO_3$ as a function of mass fraction of $Na_2SO_4$ in plant tailings samples.

Tailing pond materials, or products, byproducts or waste streams of a type that are frequently stored in tailings ponds, present unique challenges to systems and methods designed to treat these materials or to remove mineral content from them. This fact may be appreciated by considering the composition of a typical tailings stream at a boric acid mining facility. For example, one such tailings stream was analyzed by the present Applicant and was found to contain 12.5 TPH boric acid, 29.5 TPH sodium sulfate, 15.4 TPH of insoluble clays and 75.7 TPH of water. At 65° C., this tailings stream is close to saturation with regard to sodium sulfate, and Glauber's salt ($Na_2SO_4.10H_2O$) tends to precipitate from the stream as the solution cools down. This phenomenon may be appreciated with reference to the graph in FIG. 4.

Based on the above flow rates for water and boric acid, the concentration of boric acid in the tailings stream may be calculated to be about 165 g/L. Typical technologies utilized for the extraction of boron values from solutions, which include precipitation, solvent extraction, and ion exchange, are premised on boron concentrations on the order of a few hundred parts per million. Hence, these methods, as currently practiced, are either impractical for the recovery of boron from the tailings stream, or would require significant dilution of the tailings stream in order to become feasible.

Some of the systems and methodologies described herein may be further appreciated by first considering a typical solvent extraction method for boron values present in a mixture or slurry. Such a method typically utilizes a diluent along with an extractant. The extractant is typically an amphiphilic material. For example, the extractant may be an alcohol, which has a hydrophilic hydroxyl group and a hydrophobic long chain $C_xH_y$ moiety that is not water soluble. There is evidence that boric acid has an affinity for hydroxyl groups, which may be responsible for the ability of such a material to solubilize boric acid and other boron values.

Without wishing to be bound by theory, it is believed that boron has a tendency to form double bonds and macromolecules. Boron, in the form of boric acid, acts as a Lewis acid by accepting hydroxyl ions ($OH^-$) and leaving an excess of protons. Because boron complexes with organic compounds containing hydroxyl groups, it is capable of being extracted by solvents containing hydroxyl groups.

In a typical solvent extraction process for boron values, these values are to be extracted from an aqueous solution. It is thus desirable in these processes that the solvent be relatively insoluble in the aqueous phase. Consequently, complex and longer carbon chain organic solvents which contain hydroxyl groups are typically good candidates for such a process.

One preferred approach described herein for recovering boron values from tailings streams and solutions turns the conventional solvent extraction approach on its head. In particular, rather than using a solvent which is not soluble in an aqueous phase, a solvent is utilized which has a hydroxyl group and which is readily soluble in the aqueous phase. However, a different technique—preferably azeotropic distillation—is then utilized to separate the solvent (plus the boron values) from the aqueous tailings stream. To facilitate water-solvent separation, the solvent preferably has a boiling point which is lower than that of water. Hence, simple alcohols, such as methanol, ethanol, and propanol, are preferably utilized in implementations of this approach.

Figure 5:
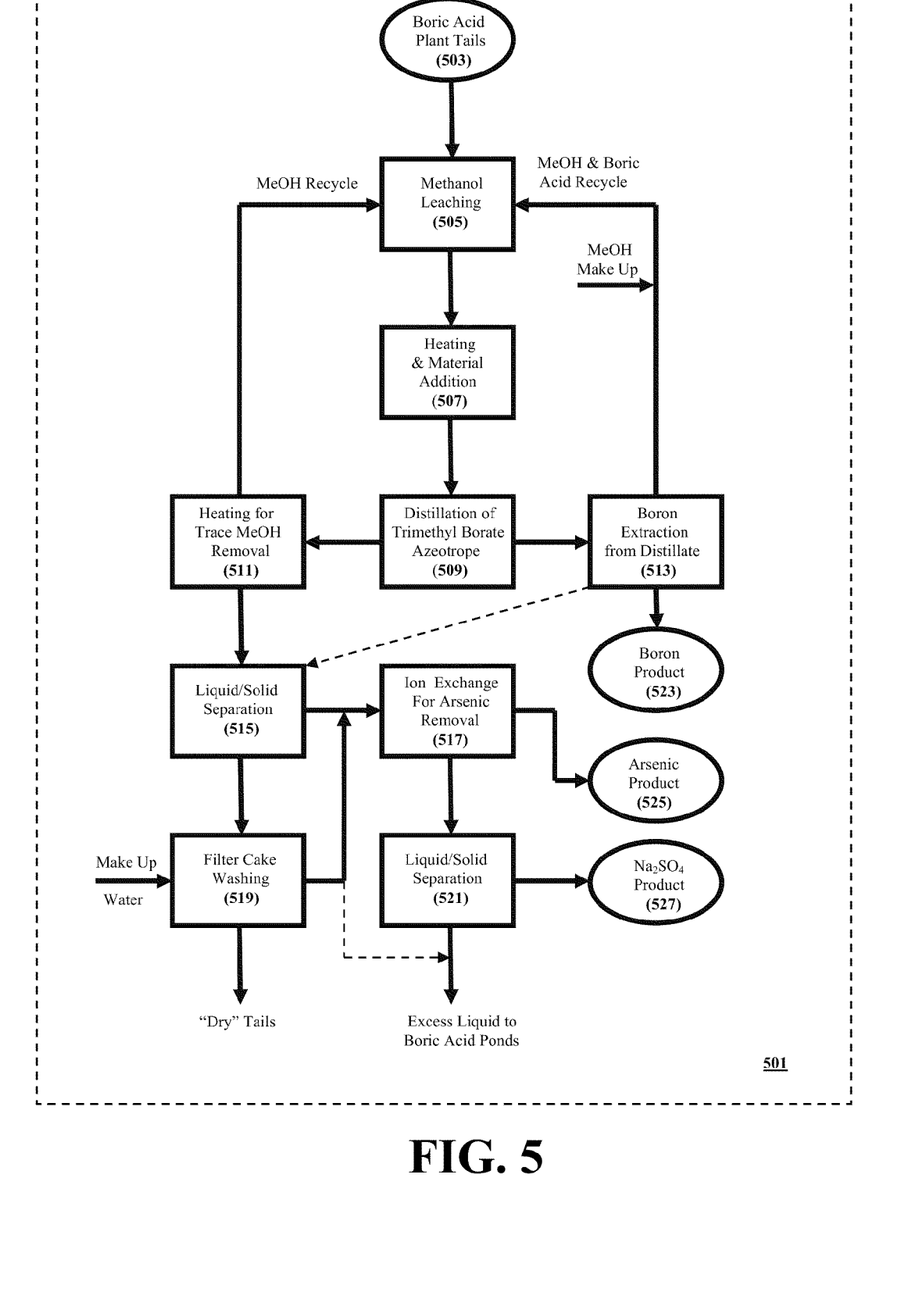
FIG. 5 is a flowchart illustrating a particular, non-limiting embodiment of a method for extracting mineral values, including boron values, from mostly liquid plant tailings in accordance with the teachings herein.

The process flow for a particular, non-limiting embodiment of this approach is depicted in FIG. 5. As seen therein, the process 501 commences with an input stream of boric acid plant tails 503. Such tails may be derived, for example, from another process, such as a primary ore recovery process. Such a primary ore recovery process may be directed towards the recovery of an ore or material which is of greater economic interest than the boron values, or may be a lower cost method which recovers the bulk of the easily extracted boron values.

The plant tails are then subjected to solvent leaching 505 to remove the boric acid content from them. The solvent is preferably methanol, although other solvents may also be employed which are miscible in water, which solvate the boron values, and which are capable of forming azeotropes with the boron values (and possibly water). Preferably, formation of the azeotrope is selective to the boron values over other non-boron containing minerals which may be present in the tailings. Examples of such solvents may include, for example, water soluble organic solvents which contain hydroxyl moieties, and more preferably includes water soluble alcohols such as, for example, methanol, ethanol, n-propyl alcohol, and iso-propyl alcohol.

The solvent leaching process preferably involves heating of the tailings, and may also include the addition of material 507. For example, in this step of the process, a stream of solution may be added to the tailings that contains boron and that is obtained from a tailings pond containing excess solution.

If methanol is used as the solvent during solvent leaching, then, on addition of methanol to the tailings, the dissolved sodium sulfate present in the tailings becomes supersaturated. This results in the formation of sodium sulfate crystals and a complex, mixed phase system. This system consists of clay particles, sodium sulfate crystals, an aqueous phase of sodium sulfate and boric acid dissolved in water, and an alcohol phase containing boric acid. The formation of sodium sulfate crystals improves subsequent liquid/solid separation, since the crystals tend to produce larger particles.

Subsequent to solvent leaching, and after the composition of the plant tails has been adjusted as necessary or desired, the boron values in the plant tails may be removed through azeotropic distillation. When methanol is used as the solvent, distillation involves distillation of a trimethyl borate azeotrope 509 (discussed in greater detail below).

The resulting distillate is then subjected to extraction of the boron values 513 (also discussed in greater detail below) to yield the boron product 523, which is preferably boric acid. This part of the process will preferably involve precipitation of boric acid from the distillate, and subsequent isolation and/or purification of the boric acid. Subsequent to extraction of the boron values, the mother liquor, which will consist primarily of solvent (e.g., methanol) and a small amount of solubilized boric acid, may be recycled to the solvent leaching step 505; in some cases, additional solvent may be added to the mother liquor as part of this process.

The portion of the plant tailing stream remaining after distillation of the azeotrope is then heated to drive off residual solvent, and any recovered solvent may be recycled to the solvent leaching step 505. For example, the tailing stream may be heated in a container equipped with a condenser column.

After removal of trace solvent, the remaining portion of the tailings stream may be subjected to liquid/solid separation 515. This may involve, for example, filtering the stream through a porous medium, treating it in a rotory evaporation device, or otherwise treating it to isolate the solids content of the stream. As indicated by the dashed line, in some cases, a portion of the liquid recovered from the extraction of the boron values (step 513) may be added to the stream prior to liquid/solid separation 515.

The solids content resulting from liquid/solid separation 515 will typically be in the form of a filter cake, which may be washed 519 (possibly with the addition of water) as necessary to remove any targeted materials from it. For example, such washing may be utilized to reduce arsenic levels in the solids below a certain threshold value. The resulting dry tails may then be disposed of in a suitable manner.

Any liquids from the washing cycle may be disposed of to a boric acid pond, or may be combined with the liquids from the liquid/solid separation step 515. The liquid from the liquid/solid separation step 515 may be processed in a suitable manner, preferably by passing it through an ion exchange column, to remove the arsenic content therefrom. The extracted arsenic values may then be recovered as a product 525, and the eluate from the column may be subjected to an additional liquid/solid separation process 521 to remove the $Na_2SO_4$ content therefrom as an $Na_2SO_4$ product 527.

As noted in the flowchart of FIG. 5, boron values may be extracted from the plant tailing stream subsequent to step 507 through distillation of a trimethyl borate azeotrope (see step 509) from the tailings stream and the subsequent extraction of the boron values (see step 513). The manner in which this may be accomplished is described above with respect to the process depicted in FIG. 3.

Various modifications to the foregoing systems and methodologies are possible. For example, while methanol is the preferred material in forming azeotropic mixtures for the purpose of boron isolation and purification, other alcohols may be used for this purpose as well. Such alcohols may include ethanol, 1-propanol and isopropanol. Other materials which solubilized boric acid or trimethyl borate, which are capable of forming azeotropic mixtures, and which are suitably selective to boron over lithium may be employed to a similar effect.

While the preferred embodiments of the systems and methodologies disclosed herein use azeotropic formation to remove boron from the impregnated resin, and use subsequent azeotropic distillation to isolate and purify the boron content, one skilled in the art will be appreciate that boron may also be recovered from the loaded resin by elutriation with an aqueous solution of a mineral acid. Hydrochloric or sulfuric acids are preferred due to ready availability and cost. The aqueous solution preferably has an acid concentration between about 10 and 100 g/L to insure substantially complete elutriation of boron to form boron-enriched solution containing between about 1 and 4 g/L boron. The concentration of the mineral acid in the aqueous solution is selected to provide maximum boron elutriation from the resin while minimizing elutriation of undesirable contaminants. While this method of stripping the resin is not the preferred method for the reasons noted above, it still affords substantially complete separation of the lithium and boron content of the feed streams, and may be advantageous in some applications.

Figure 6:
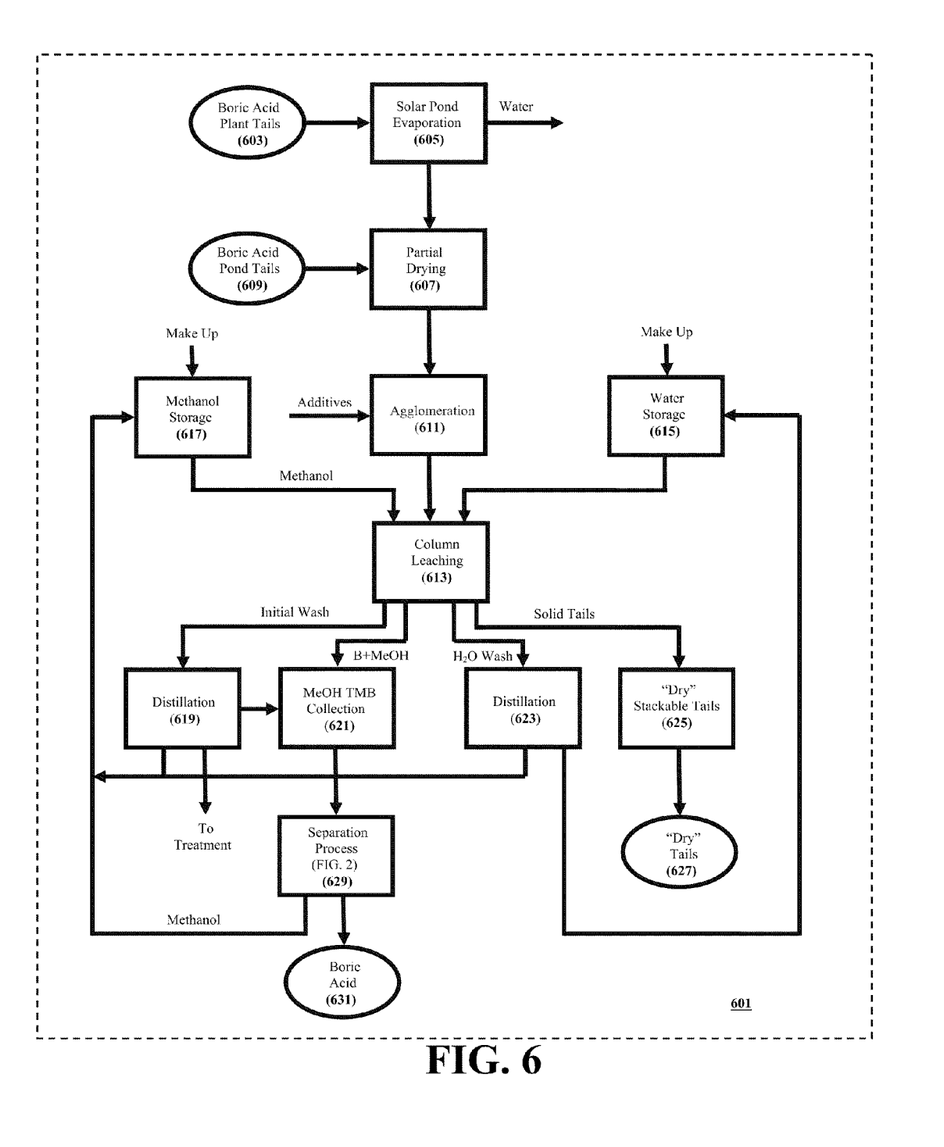
FIG. 6 is a flowchart illustrating a particular, non-limiting embodiment of a method for isolating boron values from mostly solid plant tailings.

FIG. 6 illustrates a particular, non-limiting embodiment of a process in accordance with the teachings herein which may be utilized to recover boron values from high solids or dry plant tailings. The process 601 commences with boric acid plant tails 603, which will typically be generated as a byproduct of another mining process. In some cases, the plant tails may be placed in a solar pond 605 or other such facility to evaporate some of the water content from them. The plant tails may also be subjected to subsequent drying 607, through heating or by other means, and may be combined with tails from a boric acid pond 609. The plant tails are then subjected to agglomeration 611 to produce a pelletized material. The agglomeration process may involve the addition of methanol from a methanol storage facility 617 or other suitable additives.

The pelletized plant tails are then packed into a column or other suitable solid-liquid extraction device for column leaching 613, and methanol (from a methanol storage facility 617) and/or water (from a water storage facility 615) is pumped onto the top of the pelletized material. As the methanol trickles down though the pellets, it extracts the boron values therefrom, thus forming a solution containing the boron values. Typically, this solution will contain a methanolic solution of boric acid and borax. The other materials present in the pellets, such as sodium sulfate and clay, do not dissolve in the dry methanol, and hence are left behind in the solid phase.

Dissolution of the boron species into a methanol solution also affords the opportunity to purify the boric acid in a simplified fashion. Organic alcohols such as methanol ($CH_3OH$) are known to react with boric acid according to REACTION 2 above. Although this is an equilibrium reaction, it can be driven to the product side by removal of the $B(OCH_3)_3$ (trimethyl borate) using the technique of azeotropic distillation.

Thus impure boron from tailings can be converted to a borate ester, such as trimethyl borate. The ester is then removed from the solution together with methanol by distillation/condensation/cooling in the form of a purified methanoltrimethyl borate solution that contains 75% by mass trimethyl borate. This highly concentrated solution, is then mixed with water, thus effecting the hydrolysis reaction described in REACTION 3 above.

Addition of water to the trimethyl borate solution converts the trimethyl borate to purified boric acid, which can then be recrystallized/precipitated from the solution. The methanol and water can then be distilled and recovered for reuse.

Turning again to FIG. 6, and in light of the foregoing, the column is initially washed with methanol (from the methanol storage facility 617) and water (from the water storage facility 615). The initial wash from the column gives rise to a solution containing boron values, water and methanol. This solution is subjected to distillation 619, the distillate is placed in a methanol/TMB collection facility 621, and any leftover materials from distillation are sent to a treatment facility. In some cases, additional fractions from the column may also be sent to the methanol/TMB collection facility 621.

The methanol-insoluble residue in the column is then washed with a portion of water to remove any residual methanol, and the wash material is distilled 623 to recover methanol and water. The remaining material is in the form of dry stackable tails 625 which are removed to a dry tails storage location 627. Any water or methanol recovered from the distillation process 623 is sent, respectively, to the water storage facility 615 or the methanol storage facility 617. Meanwhile, the methanol/TMB solution collected in the methanol/TMB collection facility 621 is subjected to a separation process 629 (detailed in FIG. 3) to obtain boric acid 631 therefrom, and the methanol content resulting from the separation is sent to the methanol storage facility 617.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for recovering boric acid from a solution containing boric acid and at least one lithium compound, comprising:
    passing the solution through an ion exchange resin such that boric acid accumulates on the resin;
    removing the boric acid from the resin with an aqueous alcohol solution, thus obtaining a first solution comprising an alcohol, boric acid, and water;
    converting at least a portion of the boric acid to trimethyl borate, thereby obtaining a second solution;
    distilling an azeotrope from the second solution, wherein the azeotrope contains trimethyl borate; and
    recovering boric acid from the azeotrope.

2. The method of claim 1, wherein recovering boric acid from the azeotrope includes:
    converting at least a portion of the trimethyl borate to boric acid; and
    isolating the boric acid.

3. The method of claim 2, wherein the boric acid is isolated by solid-liquid separation.

4. The method of claim 1, wherein recovering boric acid from the azeotrope includes adding water to the azeotrope.

5. The method of claim 4, wherein the azeotrope is cooled before the addition of water.

6. The method of claim 4, wherein the addition of water to the azeotrope results in the precipitation of boric acid therefrom.

7. The method of claim 1, wherein the alcohol is methanol.

8. The method of claim 1, wherein the azeotrope consists essentially of trimethyl borate, methanol and water.

9. The method of claim 1, wherein the azeotrope consists of trimethyl borate, methanol and water.

10. The method of claim 1, wherein the ion exchange resin comprises N-methyl glucamine.

11. The method of claim 10, wherein the N-methyl glucamine acts as a chelating agent.

12. The method of claim 1, wherein converting at least a portion of the boric acid to trimethyl borate comprises heating the first solution.

13. The method of claim 12, wherein the first solution is heated to a temperature of at least 60° C.

14. The method of claim 12, wherein the first solution is heated to a temperature within the range of about 60° C. to about 90° C.

15. The method of claim 12, wherein the first solution is heated to a temperature within the range of about 60° C. to about 80° C.

16. The method of claim 12, wherein the first solution is heated to a temperature within the range of about 65° C. to about 75° C.

17. The method of claim 1, wherein recovering boric acid from the azeotrope includes (a) adding water to the azeotrope under conditions suitable to precipitate boric acid therefrom, and (b) isolating the precipitated boric acid from the supernatant; and further comprising utilizing the supernatant to remove boric acid from the resin in a further iteration of the method.

18. The method of claim 17, wherein the supernatant is distilled prior to using it in a further iteration of the method.

19. A method for recovering boric acid from a solution containing boric acid and at least one lithium compound, comprising:
    passing the solution through an ion exchange resin comprising N-methyl glucamine such that boric acid accumulates on the resin;
    removing the boric acid from the resin with an aqueous methanol solution, thus obtaining a first solution comprising methanol, boric acid, and water;
    converting at least a portion of the boric acid in the first solution to trimethyl borate, thereby obtaining a second solution;
    distilling an azeotrope from the second solution, wherein the azeotrope contains trimethyl borate;
    adding water to the distilled azeotrope under conditions which result in the precipitation of boric acid therefrom; and
    isolating the boric acid from the supernatant through filtration.

* * * * *